United States Patent [19]

Ida

[11] Patent Number: 4,623,946
[45] Date of Patent: Nov. 18, 1986

[54] MODE CHANGING MECHANISM FOR CASSETTE TAPE RECORDING AND/OR REPRODUCING APPARATUS

[75] Inventor: Mitsuru Ida, Saitama, Japan

[73] Assignee: Sony Corporation, Tokyo, Japan

[21] Appl. No.: 635,605

[22] Filed: Jul. 30, 1984

[30] Foreign Application Priority Data

Jul. 30, 1983 [JP] Japan ............... 58-119650[U]

[51] Int. Cl.⁴ .......................................... G11B 15/10
[52] U.S. Cl. .................................. 360/96.3; 360/93
[58] Field of Search ................... 360/93, 96.1–96.4; 242/201–204

[56] References Cited

U.S. PATENT DOCUMENTS

| | | | |
|---|---|---|---|
| 4,102,517 | 7/1978 | Cicatelli | 242/201 |
| 4,185,794 | 1/1980 | Mukaida | 242/201 |
| 4,300,735 | 11/1981 | Ichikawa | 242/201 |
| 4,468,711 | 8/1984 | Schoenmakers et al. | 360/96.3 |

*Primary Examiner*—John H. Wolff
*Assistant Examiner*—Matthew J. Bussan
*Attorney, Agent, or Firm*—Lewis H. Eslinger; Alvin Sinderbrand

[57] ABSTRACT

In a cassette tape recording and/or reproducing apparatus having a tape drive with a rotatable idler which is bodily shiftable for changing the operating mode, a mode changing mechanism has first and second mode selecting slide members mounted on a chassis for independent movements along parallel paths between operative and inoperative positions, a pivot arm carrying the idler and being swingable in opposite directions, for example, for establishing fast-forward and rewind modes, respectively, a coupling member straddling the slide members and being engageable with the pivot arm and with actuating members which are provided on the slide members, respectively, and which engage the coupling member at respective locations thereon spaced apart in a direction transverse to the paths of movement of the slide members, and a spring acting on the coupling member along a line of force which is intermediate the locations where the actuating members engage the coupling member and in a direction for causing the coupling member to simultaneously move the slide members to their inoperative positions. The movement of a selected one of the slide members to its operative position turns the coupling member about the actuating member on the other slide member and thereby effects swinging of the pivot arm in one direction or the other for establishing a corresponding mode.

13 Claims, 28 Drawing Figures

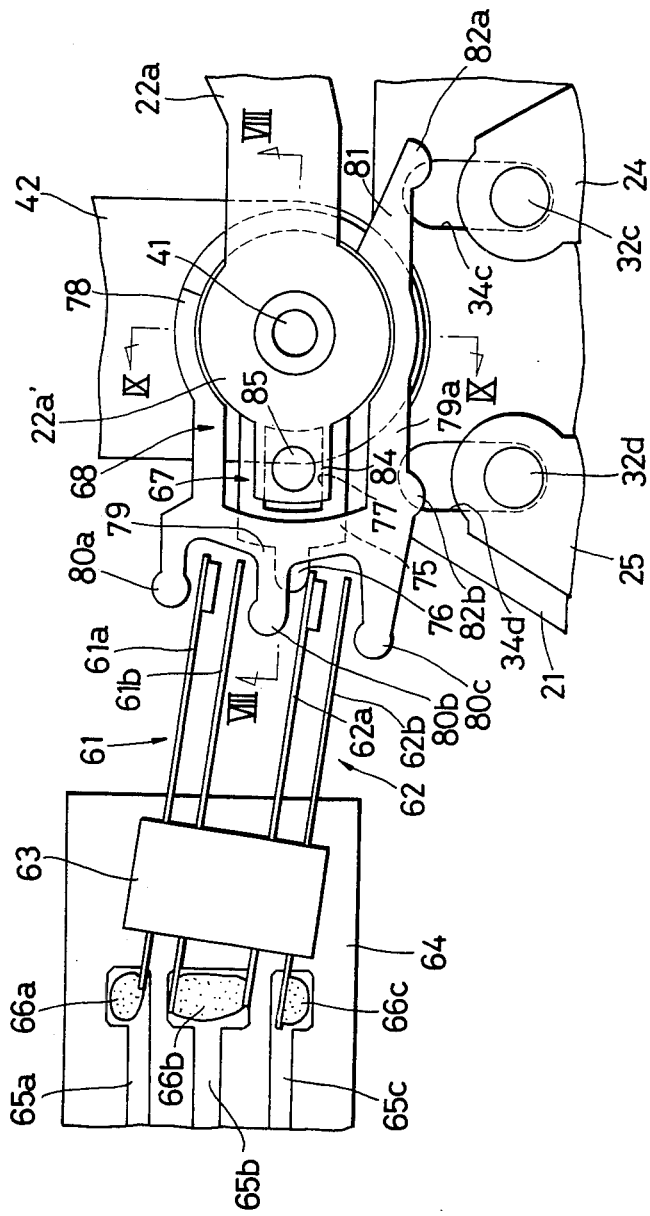

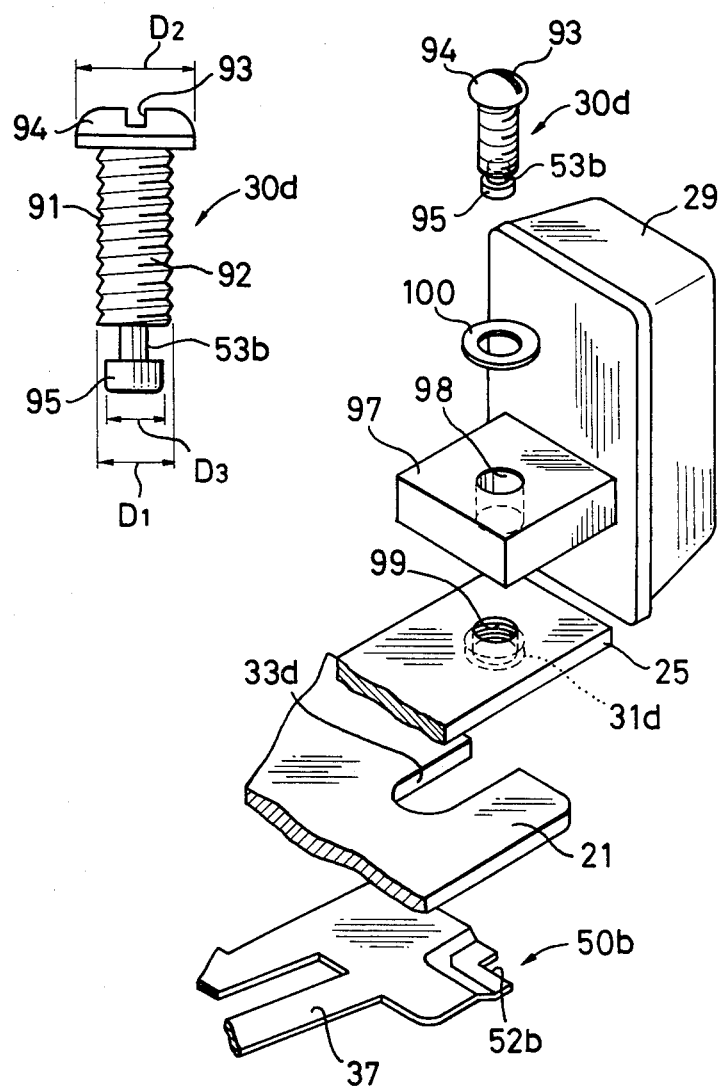

MODE CHANGING MECHANISM FOR CASSETTE TAPE RECORDING AND/OR REPRODUCING APPARATUS

BACKGROUND OF THE INVENTION

1. Field of the Invention

This invention relates generally to cassette tape recording and/or reproducing apparatus, and more particularly is directed to an improved mode changing mechanism therefor.

2. Description of the Prior Art

Various mechanisms have been proposed for changing or selecting the operating mode of cassette tape recording and/or reproducing apparatus. Such mechanisms generally include numerous slides, levers and rotary members for selecting or establishing the different modes, respectively, of the apparatus. Further, springs are provided for returning the slide members and levers and for holding the rotary members in their neutral or inoperative positions, and each of these springs has to be individually connected to the respective parts. Particularly in those mode changing mechanisms provided with a plurality of rotary members which are separately employed for driving the tape reels at different speeds, for example, the normal speed for recording and reproducing or playback, and the high speed for the fast-forward and rewind modes, an undesirably large number of parts are required for the mode changing mechanism so that the assembling thereof is difficult, time consuming and costly.

OBJECTS AND SUMMARY OF THE INVENTION

Accordingly, it is an object of the present invention to provide a mode changing mechanism for a cassette tape recording and/or reproducing apparatus which avoids the foregoing disadvantages of the prior art.

More specifically, it is an object of this invention to provide a mode changing mechanism for a cassette recording and/or reproducing apparatus which embodies a reduced number of parts so as to result in a relatively simple, compact and easily assembled structure.

In accordance with an aspect of this invention, in a cassette tape recording and/or reproducing apparatus having a tape drive including a transmission member or idler which is shiftable for changing the operating mode, a mode changing mechanism comprises first and second mode selecting slide members mounted on a chassis for movements independently of each other along substantially parallel paths between respective operative and inoperative positions, a pivot arm carrying the transmission member of the tape drive and being movable for shifting such transmission member, a coupling member straddling the first and second slide members and being engageable with the pivot member, first and second actuating members on the first and second slide members, respectively, and being engageable with the coupling member at first and second locations, respectively, on the latter spaced apart in a direction transverse to the paths of movement of the slide members, and a spring connected between the chassis and coupling member and acting on the latter along a line of force which is intermediate said first and second locations and in a direction for simultaneously urging the coupling member against the first and second actuating members and thereby urging the first and second slide members to their inoperative positions. In the foregoing mode changing mechanism according to this invention, the movement of a selected one of the slide members to its operative position is effective to turn the coupling member about the actuating member on the other of the slide members and thereby effects swinging movement of the pivot arm and corresponding shifting of the transmission member or idler for establishing a corresponding operating mode of the apparatus.

In a desirable embodiment of the invention, the pivot arm is pivotally mounted on a third mode selecting slide member which is movable parallel to the first and second slide members from an inoperative position to an operative position, for example, for establishing the play mode of the apparatus by translation of the pivot arm, and hence of the transmission member or idler rotatable thereon, in a third direction.

The above, and other objects, features and advantages of the invention, will be apparent in the following detailed description of an illustrative embodiment thereof which is to be read in connection with the accompanying drawings, wherein the same parts are identified by corresponding reference numerals in the several views of the drawings.

BRIEF DESCRIPTION OF THE DRAWINGS

FIG. 6 is an enlarged plan view of that portion of the mode changing mechanism shown on FIG. 2 provided for actuating switches by which the tape drive motor is controlled;

FIG. 12 is an enlarged detail elevational view of a screw member included in the mode changing mechanism according to this invention;

FIG. 13 is an exploded perspective view of a pushbutton assembly and associated elements included in the mode changing mechanism according to this invention;

DETAILED DESCRIPTION OF A PREFERRED EMBODIMENT

Figure 1:
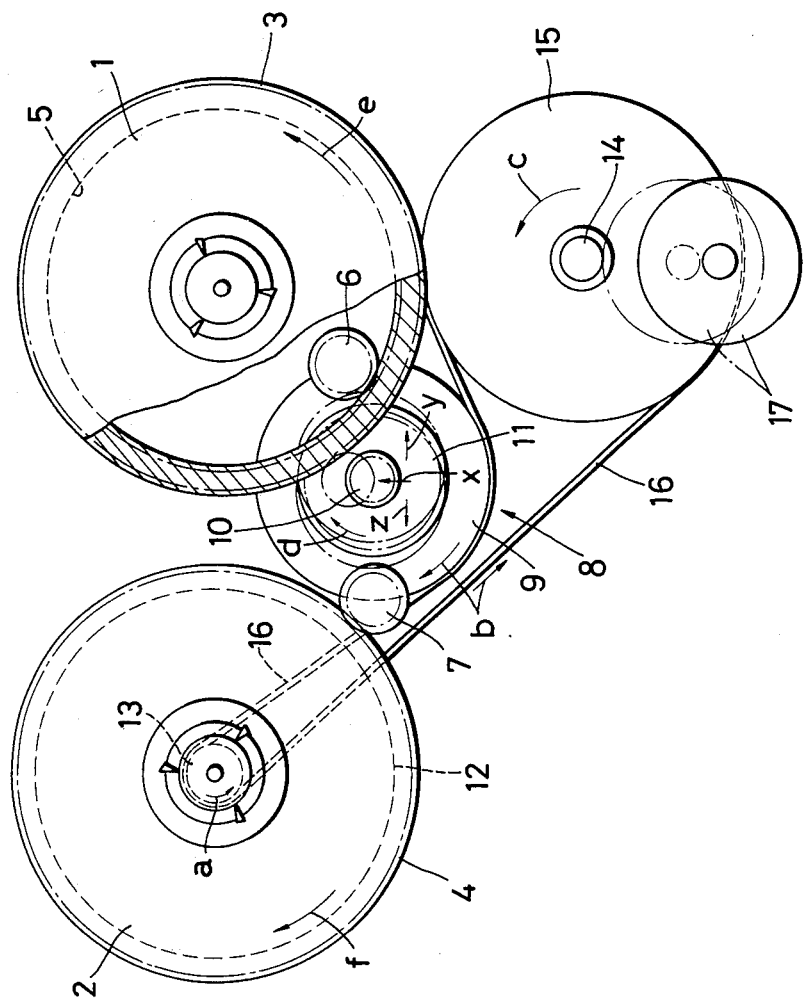
FIG. 1 is a schematic plan view on an enlarged scale, and partly broken away and in section, of a tape drive for a cassette tape recording and/or reproducing apparatus embodying this invention.

Referring to the drawings in detail, it will be appreciated that the present invention is there shown specifically applied to a portable cassette tape recording and/or reproducing apparatus of the kind adapted to accommodate a cassette containing rotatable supply and take-up reels in side-by-side arrangement, with the magnetic tape wound on such reels being guided therebetween in a run extending along a straight side of the cassette and being there exposed through windows in the peripheral wall of the cassette. Thus, the cassette tape recording and/or reproducing apparatus for accommodating such standard cassette is shown on FIG. 1 to include take-up and supply reel drive members 1 and 2 shown in the form of discs rotatable about transversely spaced apart axes and having outer gears 3 and 4, respectively, rotatably coupled therewith. Take-up reel drive member 1 is further shown to have an inner or internal gear 5 rotatably coupled therewith, and intermediate gears 6 and 7 are in permanent meshing engagement with inner gear 5 and outer gear 4, respectively. Located approximately midway between intermediate gears 6 and 7 is an idler or transmission member 8 which includes, as integral parts thereof, a pulley 9, a relatively small diameter forward (FWD) gear 10, and a fast-forward or rewind, (FR) gear 11 of relatively large diameter. A relatively flat motor 12 capable of operating at a normal speed and a relatively high speed is coaxially mounted below supply reel drive member 2 and has a motor pulley 13 secured on its shaft. A capstan 14 with a fly wheel 15 fixed thereto is rotatably mounted to extend into an operatively positioned cassette and is rotatably driven from motor pulley 13 by way of an endless belt 16 which runs around pulley 13 and a pulley defined by the periphery of fly wheel 15, and which further engages pulley 9 of idler 8 for also rotating the latter. A pinch roller 17 is suitably mounted adjacent capstan 14 so as to be movable from an inoperative position shown in full lines on FIG. 1 to an operative position shown in dot-dash lines and in which pinch roller 17 extends into a window of the operatively positioned cassette for pressing a run of the tape therein against rotated capstan 14.

In the stop mode of the apparatus represented by the full lines on FIG. 1, idler 8 is disposed in a neutral position in which FWD gear 10 is disengaged from outer gear 3 of take-up reel drive member 1 and FR gear 11 is disengaged from both intermediate gears 6 and 7.

In a play mode of the apparatus, motor 12 is suitably operated to rotated pulley 13 in the direction of the arrow a and thereby drive belt 16 in the direction of the arrows b. Therefore, capstan 14 and idler 8 are rotated in the directions of the arrows c and d, respectively. Further, in the play mode of the appartus, idler 8 is moved or shifted from its neutral position in the direction of the arrow x, as hereinafter described in detail, so that FWD gear 10 is brought into meshing engagement with outer gear 3, as shown in dot-dash lines, so as to effect rotation of take-up reel drive member 1 in the direction of the arrow e. Further, in the play mode, pinch roller 17 is suitably moved into engagement with capstan 14, as shown in dot-dash lines, so that the tape is fed therebetween by the rotated capstan 14 at a constant speed and is wound onto the take-up reel of the cassette engaged with the drive member 1.

In a fast-forward mode of the apparatus, motor 12 is again operated, but preferably at a relatively high speed, as hereinafter described in detail, with the result that idler 8 is rotated at a relatively high speed in the direction of the arrow d. In the fast-forward mode, pinch roller 17 remains in its inoperative position shown in full lines on FIG. 1, and idler 8 is moved from its neutral position in the direction of the arrow Y so that FR gear 11 is brought into meshing engagement with intermediate gear 6, as shown in dot-dash lines on FIG. 1. Therefore, in the fast-forward mode, take-up reel drive member 1 is rotated in the direction of the arrow e at a relatively high speed, with the result that the tape is quickly unwound from the supply reel engaged with drive member 2 and similarly quickly rewound on the take-up reel engaged with drive member 1.

In the rewind mode of the apparatus, motor 12 is again operated at high speed and thereby drives idler 8 at high speed in the direction of the arrow d. However, in this case, idler 8 is moved or shifted from its neutral position in the direction of the arrow Z so that, FR gear 11 now meshes with intermediate gear 7, as shown in dot-dash lines, with the result that supply reel drive member 2 is rotated at relatively high speed in the direction of the arrow f. Thus, tape is quickly unwound from the take-up reel engaged by drive member 1 and is rapidly rewound on the supply reel engaged with drive member 2.

Figure 2:
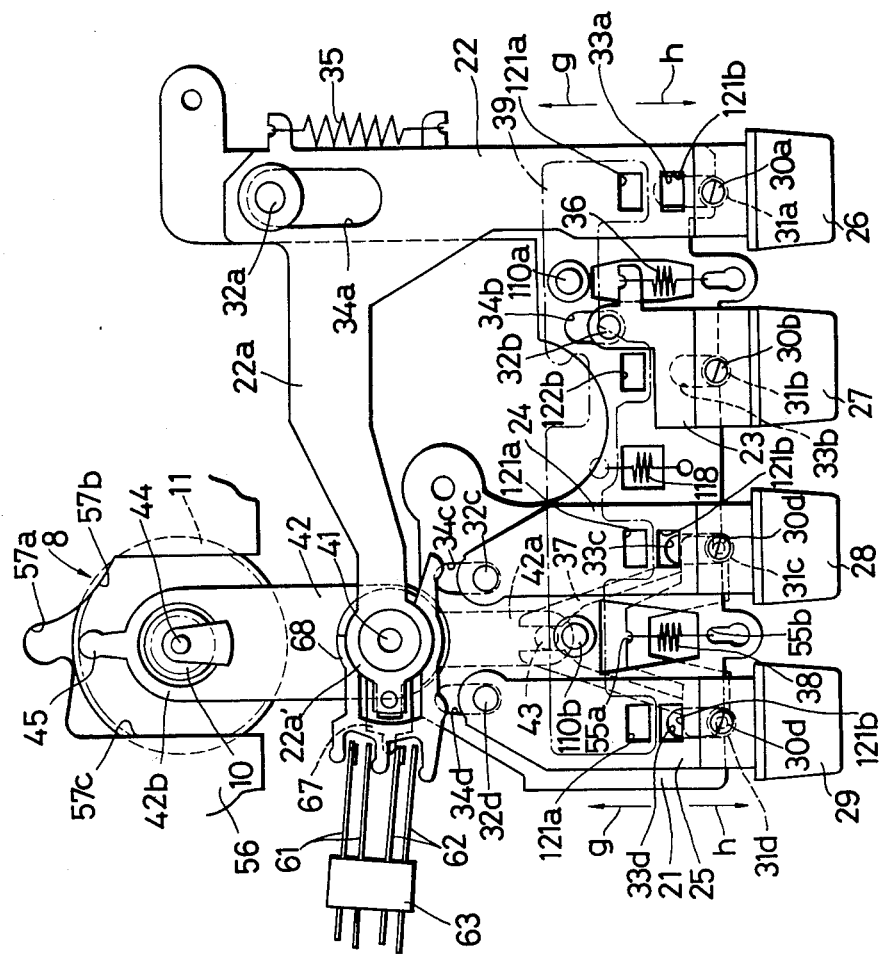
FIG. 2 is a plan view of a mode changing mechanism for a cassette tape recording and/or reproducing apparatus according to an embodiment of this invention.

Referring now to FIG. 2, it will be seen that a mode changing mechanism for the cassette tape recording and/or reproducing apparatus described with reference to FIG. 1 generally comprises a sub-chassis 21 and mode selecting slide members 22,23,24 and 25 slidably mounted on sub-chassis 21 for movements relative to the latter independently of each other along substantially parallel paths in the directions indicated by the arrows g and h. More particularly, slide members 22,23,24 and 25 are selectively movable independently of each other in the direction of the arrow g from their respective inoperative positions shown on FIG. 2 for selecting the play mode, the stop mode, the fast-forward and the rewind mode, respectively, of the apparatus. Push-buttons 26,27,28 and 29 are secured to forward ends of slide members 22,23,24 and 25, respectively, by screws 30a,30b,30c and 30d which are threadably engaged in collars 31a,31b,31c and 31d depending integrally from slide members 22,23,24 and 25, respectively. Thus, push-buttons 26,27,28 and 29 can be selectively manually depressed for selecting the play, stop, fast-forward and rewind modes, respectively, of the apparatus.

For the purpose of guiding slide members 22–25 in their movements in the directions of the arrows g and h, the collars 31a–31d depending from slide members 22–25 are slidably received in suitably laterally spaced apart slots 33a–33d formed in the forward portion of sub-chassis 21. Posts 32b, 32c and 32d depend from slide members 23, 24 and 25, respectively, at locations spaced rearwardly from collars 31b, 31c and 31d and are slidably engaged in slots 34b, 34c and 34d, respectively, in sub-chassis 21 for maintaining slide members 23–25 in parallel relation during their movements between inoperative and operative positions. Similarly, a post 32a is directed upwardly from a rear portion of sub-chassis 21 and is slidably engaged in an elongated slot 34a formed in an end portion of slide member 22 remote from the respective push-button 26. Slide member 22 for selecting the play mode is urged in the direction of the arrow h to its inoperative position by a spring 35 connected between suitable anchors on sub-chassis 21 and slide member 22. Similarly, slide member 23 for selecting the stop mode is urged in the direction of the arrow h to its inoperative position by a spring 36 connected between an anchor on slide member 23 and a suitable anchor hole in a forward portion of sub-chassis 21.

In accordance with the present invention, a coupling member 37 which is located below sub-chassis 21 straddles the paths of the slide members 24 and 25 and is acted upon by a single spring 38 connected between coupling member 37 and sub-chassis 21 for simultaneously urging both slide members 24 and 25 in the direction of the arrow h to their respective inoperative positions. The mode changing mechanism according to this invention further generally comprises a latch plate 39 disposed above slide members 22–25 for locking or latching any one of the slide members 22, 24 and 25 in its operative position after such slide member has been displaced in the direction of the arrow g for selecting the play mode, fast-forward mode or rewind mode, respectively, of the apparatus.

As shown particularly on FIGS. 2 and 3A–3C, slide member 22 for selecting the play mode is formed, at its rear portion, with a laterally directed arm 22a having a free end portion 22a' located approximately midway between the parallel paths of movement of slide members 24 and 25. A pivot pin 41 depends from end portion 22a' and defines a pivot axis for a pivot arm 42 which is mounted, intermediate its ends, on pin 41. A post or pin 43 depends from the forward end portion 42a of pivot arm 42 and is engageable by coupling member 37 below sub-chassis 21 as hereinafter described in detail. The opposite or rear end portion 42b of pivot arm 42 carries a shaft 44 on which idler 8 is rotatably supported. A projection 45 extends from the end portion 42b of pivot arm 42 for stabilizing the position of the latter in the play mode of the apparatus, as hereinafter described in detail.

As shown particularly on FIGS. 4 and 5A–5C, coupling member 37 for forming a connection between slide members 24 and 25 and pivot arm 42 below sub-chassis 21 may be formed of a plate spring metal and has a U-shaped central portion 47 with flanks 48 extending laterally outward from the ends of such central portion, and resilient arms 49a and 49b converging rearwardly from flanks 48 to the free ends 49a' and 49b' which have parallel spaced apart edges between which post 43 is slidably received. Receptacles 50a and 50b are defined at the outer ends 48a and 48b of flanks 48 for receiving actuating members 51a and 51b on slide members 24 and 25, respectively. In the illustrated embodiment, receptacles 50a and 50b are defined by notched bosses 52a and 52b formed at the respective ends of flanks 48, and the actuating members 51a and 51b are constituted by grooves 53a and 53b formed in the lower end portions of the screws 30c and 30d, as hereinafter described in detail. The post or pin 43 depending from the forward end of pivot arm 42 preferably has a flange 54 at its lower end to guide the end portions 49a' and 49b' of resilient arms 49a and 49b in engagement with pin 43.

Figure 3A:
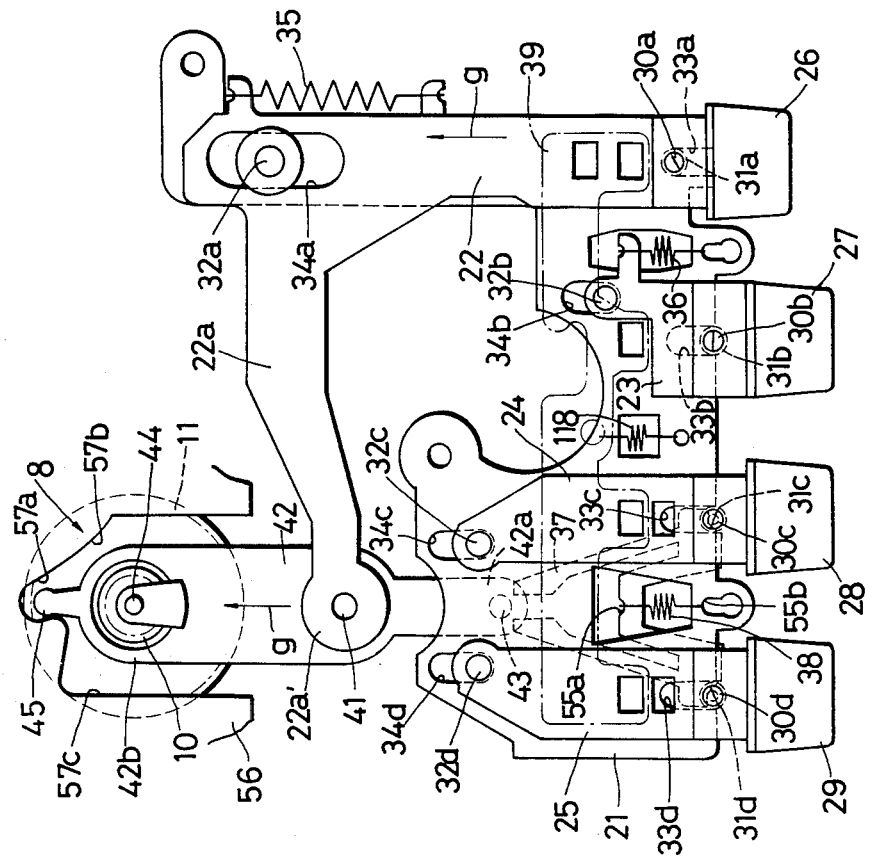
FIGS. 3A, 3B and 3C are enlarged plan views of a substantial portion of the mode change mechanism of FIG. 2, but showing the condition of such mechanism for establishing the play mode, the fast-forward mode and the rewind mode of the apparatus.
Figure 4:
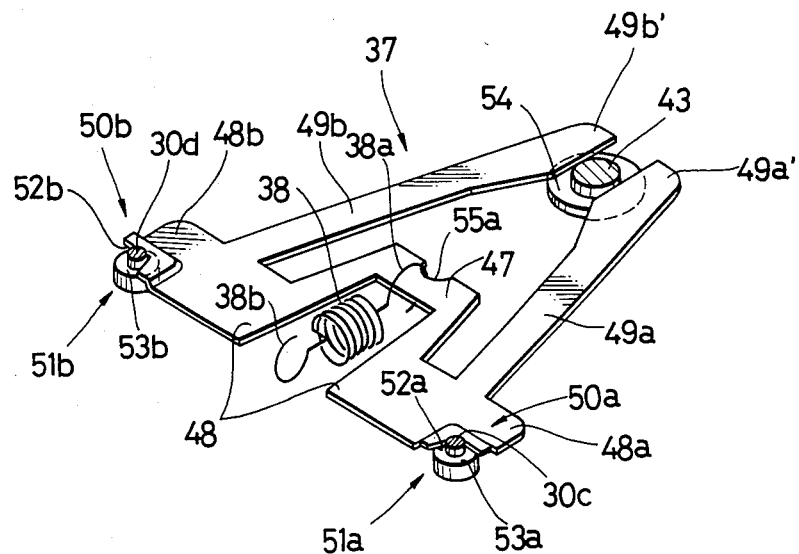
FIG. 4 is a perspective view of a coupling member included in the mode changing mechanism according to this invention.

As shown in detail on FIG. 4, spring 38 for urging coupling member 37 in the direction of the arrow h on FIG. 2 has a hook 38a at one end engageable in a recess 55a of central portion 47, while a hook 38b at the other end of spring 38 is engaged in an anchor hole 55b (FIG. 3A) formed in the adjacent forward portion of the sub-chassis 21.

Figure 5A:
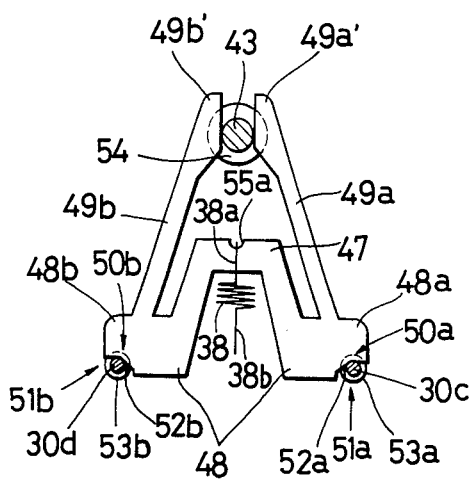
FIGS. 5A, 5B and 5C illustrate the condition of the coupling member of FIG. 4 for establishing the stop mode, the fast-forward mode and the rewind mode, respectively, of the apparatus.

To the extent so far described, the mode changing mechanism embodying this invention operates as follows:

In the stop mode of the apparatus illustrated on FIG. 2, slide members 22–25 and the respective push-buttons 26–29 are moved in the direction of the arrow h to their inoperative positions by means of the springs 35, 36 and 38. As shown in FIG. 5A, in the stop mode, spring 38 acts on coupling member 37 along a line of force intermediate the locations at which receptacles 50a and 50b engage actuating members 51a and 51b, respectively. Thus, spring 38 urges coupling member 37 in the direction of the arrow h so that receptacles 50a and 50b are urged against actuators 51a and 51b for similarly urging slide members 24 and 25 to their inoperative positions. With slide member 22 in its inoperative position, and with coupling member 37 squarely oriented, as shown in FIG. 5A, in response to the inoperative positions of slide members 24 and 25, pivot arm 42 is disposed to locate idler 8 in its neutral position.

When slide member 22 is moved in the direction of the arrow g for establishing the play mode of the apparatus, as shown in FIG. 3A, pivot arm 42 undergoes a similar translational movement in the direction of the arrow g by reason of its mounting on arm 22a. At least during a major portion of such translational movement of pivot arm 42, pin or post 43 at the forward end 42a of pivot arm 42 is guided by the end portions 49a' and 49b' of resilient arms 49a and 49b so that arm 42 is moved parallel to the direction of movement of slide member 22. In response to such translational movement of pivot arm 42, idler 8 is moved in the direction of the arrow x on FIG. 1 to engage FWD gear 10 with outer gear 3 of take-up reel drive member 1, thereby establishing the play mode of the apparatus. Further, at the conclusion of the translational movement of pivot arm 42, projection 45 at the rear end of pivot arm 42 engages in a guide recess 57a formed in a chassis plate 56 so that pivot arm 42 is then stably held in a position where FWD gear 10 meshes with outer gear 3. Of course, the movement of slide member 22 to its operative position for selecting the play mode is also suitable effective to move a head base plate (not shown) to its operative position with the result that a magnetic head (not shown) and pinch roller 17 on the head base plate will be moved into contact with the magnetic tape, as is conventional.

Figure 3B:
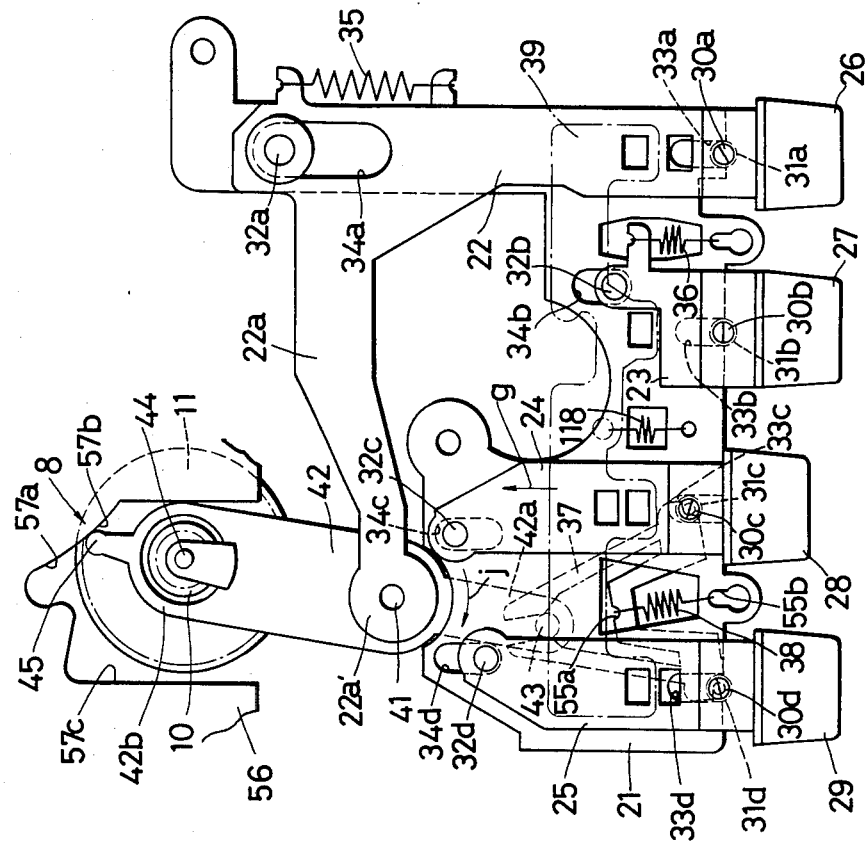
Figure 5B:
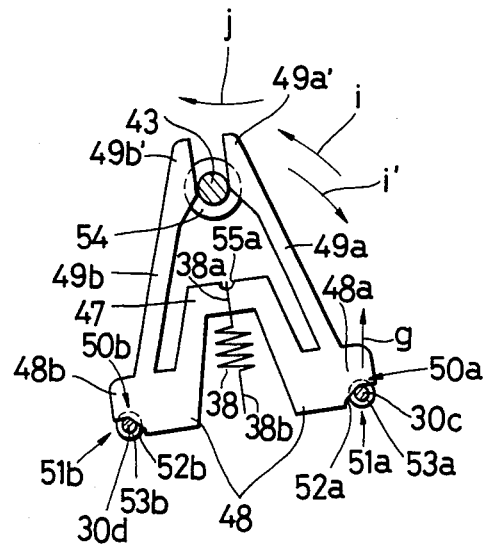

Referring now to FIGS. 3B and 5B, it will be seen that, in response to the movement of slide member 24 in the direction of the arrow g to its operative position, actuating member 51a thereon pushes the respective receptacle 50a in the direction of the arrow g so that coupling member 37 is turned or canted in the direction of the arrow i about an axis defined by the other actuating member 51b, while spring 38 yieldably resists such turning or canting of the coupling member. In response to the turning or canting of coupling member 37 in the direction of the arrow i on FIG. 5B, pivot arm 42 is turned in the direction of the arrow j around the pivot pin 41 by reason of the force exerted in the direction of the arrow i by the end portion 49a' of resilient arm 49a against pin or post 43. When slide member 24 is locked or latched in its operative position by latch plate 39, as hereinafter described in detail, FR gear 11 meshes with intermediate gear 6 in response to the movement of idler 8 in the direction of the arrow y on FIG. 1 for establishing the fast-forward mode, as previously described. The meshing of FR gear 11 with intermediate gear 6 is controlled by the engagement of projection 45 on pivot arm 42 with a limiting surface 57b of chassic plate 56, as shown on FIG. 3B. At such time, resilient arm 49a of coupling member 37 is flexed slightly in the direction of the arrow i' on FIG. 5B so that a continuous resilient force is applied to pivot arm 42 for holding the latter in the position shown on FIG. 3B, that is, in the position for the fast-forward mode of the apparatus.

Figure 3C:
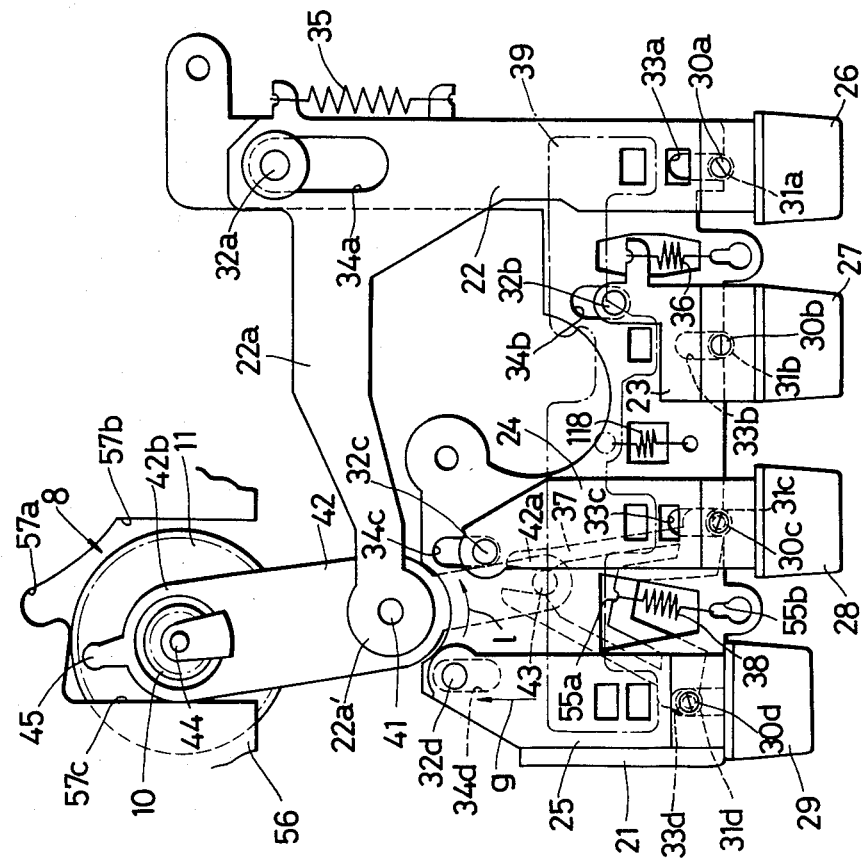
Figure 5C:
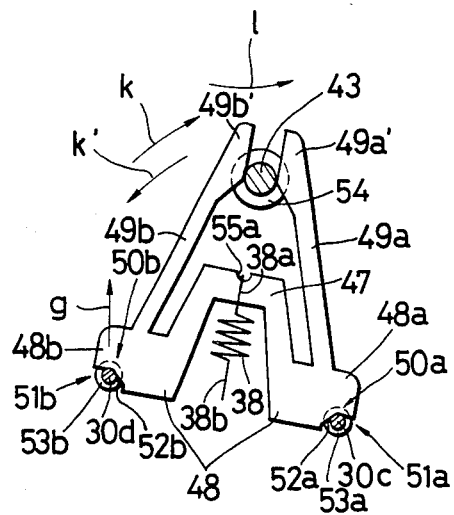

Referring now to FIGS. 3C and 5C, it will be seen that, when slide member 25 is moved in the direction of the arrow g to its operative position for selecting the rewind mode of the apparatus, the actuating member 51b on that slide member pushes receptacle 50b of coupling member 37 in the direction of the arrow g so that coupling member 37 is turned or canted in the direction of the arrow k about an axis defined by the actuating member 51a, while spring 38 yieldably resists such turning or canting of member 37. In response to turning of coupling member 37 in the direction of the arrow k, pivot arm 42 is turned in the direction of the arrow l around the pivot pin 41 to the action of the end portion 49b' of resilient arm 49b against pin or post 43 in the direction of the arrow k. The turning of pivot arm 42 in the direction of the arrow l shifts or moves idler 8 in the direction of the arrow Z on FIG. 1 so that FR gear 11 meshes with intermediate gear 7 and thereby establishes the rewind mode of the apparatus, as previously described. At the completion of the turning of pivot arm 42 in the direction of the arrow l on FIG. 3C, end portion 42b of pivot arm 42 engages against a stop surface 57c of chassis plate 56 with resilient arm 49b of coupling member 37 being then flexed in the direction of the arrow k'. Thus, resilient arm 49b exerts a continuous resilient force for holding end portion 42b against stop surface 57c and thereby stabilizing the engagement of FR gear 11 with intermediate gear 7 in the rewind mode.

When push-button 27 is depressed in the direction of the arrow g against the force of spring 36 while the apparatus is in its play, fast-forward or rewind mode, latch plate 39 is released, as hereinafter described in detail, so that slide member 22,24 or 25 can be returned to its inoperative position for restoring the apparatus to its stop mode, as illustrated on FIG. 2.

It is desirable that the speed with which the tape is transferred between the take-up and supply reels of the cassette in the fast-forward and rewind modes be very substantially larger than the normal tape speed for recording and/or reproducing, that is, greater than the normal tape speed by an amount larger than that caused by the difference in gear ratios when FWD gear 10 meshes with outer gear 3 and when FR gear 11 meshes with intermediate gear 6 or 7, respectively. In order to achieve the foregoing, motor 12 is desirably operable at a normal speed in the play mode of the apparatus and at a high speed in the fast-forward and rewind modes. Referring now to FIG. 6, it will be seen that, in order to achieve such normal and high speed operations of motor 12, the apparatus embodying this invention further comprises a first switch 61 having a pair of normally spaced apart contact leaves 61a and 61b which are brought together for actuating or closing the respective switch 61 and thereby supplying power to motor 12, and a second switch 62 also having a pair of normally spaced apart contact leaves 62a and 62b which can be brought together for actuating or closing the respective switch 62 and thereby changing or increasing the operating speed of motor 12. As shown, switches 6 and 62 are arranged with the respective pairs of contact leaves spaced apart and normally extending parallel to each other from a common insulator block 63 fixed on a printed circuit board 64 which is suitably mounted adjacent pivot pin 41. The ends of contact leaves 61a,61b and 62a, and 62b adjacent insulator block 63 are electrically connected to printed patterns 65a,65b and 65c on board 64 by solder 66a,66b and 66c. The arrangement of the printed circuits on board 64 for controlling motor 12 is such that, when only switch 61 is closed or actuated, motor 12 is operated at its normal speed whereas, when switches 61 and 62 are both simultaneously closed or actuated, motor 12 is operated at its high speed.

In order to provide for such selective actuation or closing of switches 61 and 62, the free end portions of the respective contact leaves are arranged alongside the path of travel of pivot pin 41 with arm 22a of play mode selecting slide member 22, and first and second switch actuating members 67 and 68 molded or otherwise formed of synthetic resins are mounted about pivot pin 41 so as to turn about the latter and participate in the translational movements of pivot arm 42.

Figure 7:
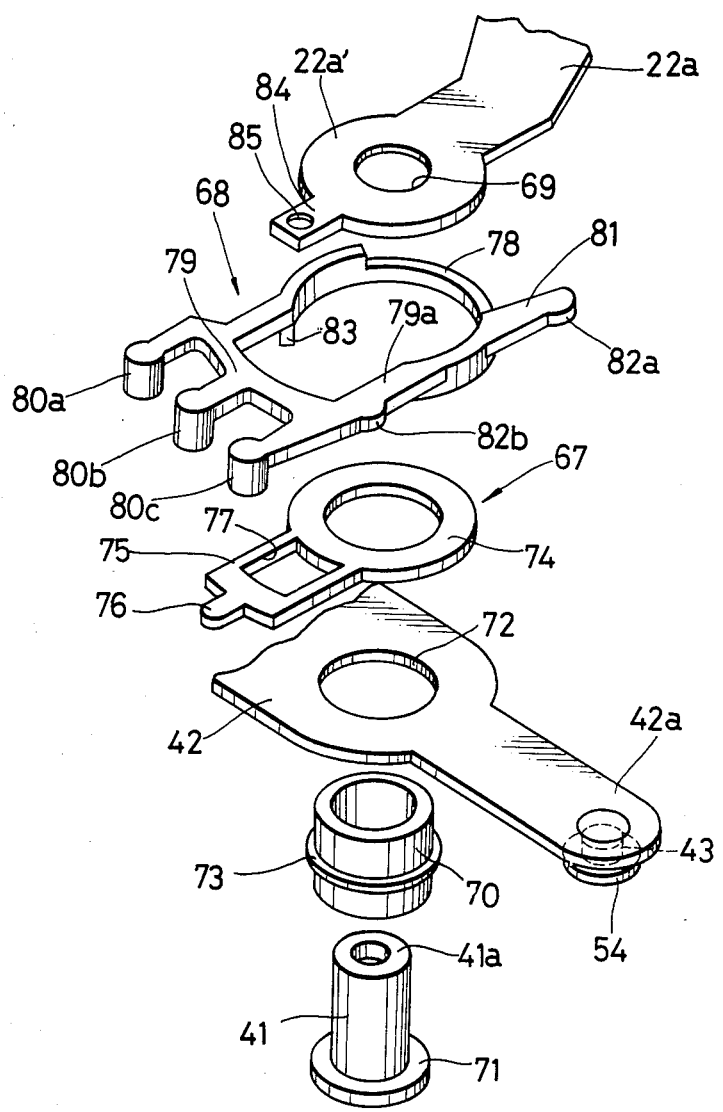
FIG. 7 is an exploded perspective view of switch actuating elements and associated parts shown on FIG. 6.
Figure 8:
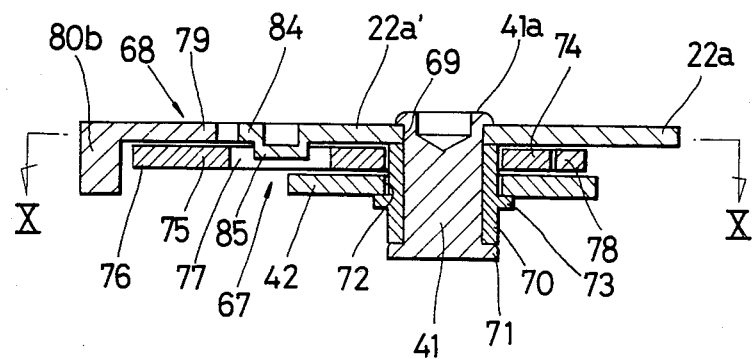
FIG. 8 is a sectional view taken along the line VIII—VIII on FIG. 6.
Figure 9:
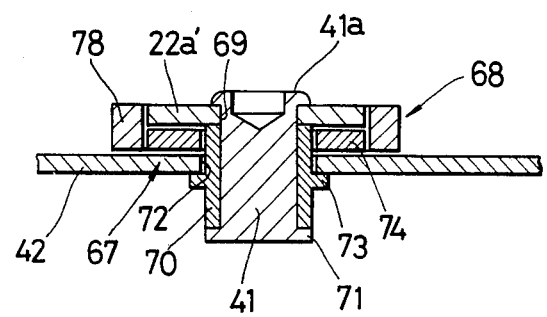
FIG. 9 is a sectional view taken along the line IX—IX on FIG. 6.

As shown particularly on FIGS. 7, 8 and 9, a sleeve 70 extends around pivot pin 41 and rests on a flange 71 at the lower end of the latter. The upper end portion 41a of pivot pin 41 extends above sleeve 70 through a hole 69 in the end portion 22a' of arm 22a, and such upper end 41a of pivot pin 41 is swaged above arm 22a (FIGS. 8 and 9) for securing pin 41 to arm 22a. A hole 72 is provided in pivot arm 42 intermediate the ends of the latter and extends turnably about sleeve 70 above an annular rim 73 on the latter. Switch actuating member 67 includes a ring portion 74 which extends around sleeve 70 above pivot arm 42, and an arm portion 75 extending radially from ring portion 74 and terminating in a projection 76. Further, arm portion 75 has an approximately rectangular aperture 77 therein. The other or second switch actuating member 68 includes a C-shaped arcuate portion 78 dimensioned to extend closely around ring portion 74 and defining a gap between the ends 83 of C-shaped portion 78 through which arm portion 75 can lossely extend. Parallel arms 79a,79b extend from the ends of C-shaped portion 78 to a bridging portion 79 from which three spaced apart fingers or projections 80a,80b and 80c extend outwardly and downwardly. A tail portion 81 extends from C-shaped portion 78 in the direction opposed to arm 79a, and convex nodes 82a and 82b are formed at the outer sides of tail portion 81 and arm 79a at approximately equal distances from the center of C-shaped portion 78.

Figure 10:
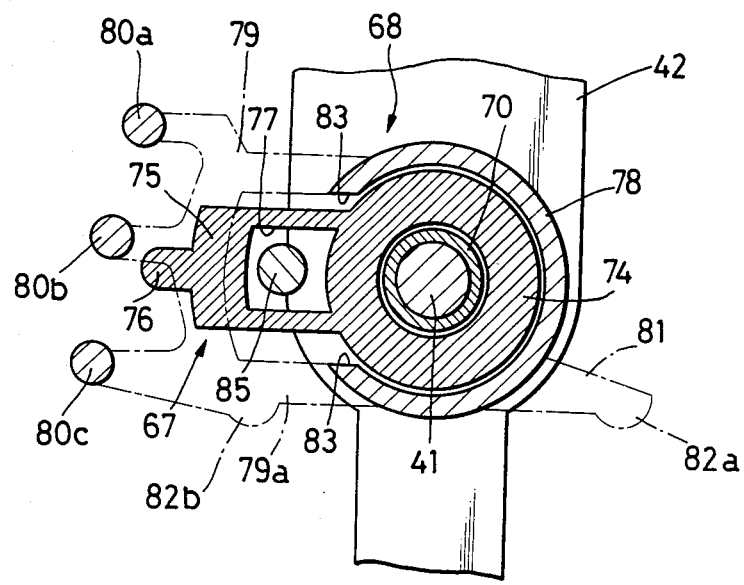
FIG. 10 is a sectional view taken along the line X—X on FIG. 8.

The maximum height of C-shaped portion 78 of actuating member 68 is shown to be approximately equal to the combined thicknesses of the ring-shaped portions 22a' and 74 of arm 22a and actuating member 67, respectively, and C-shaped portion 78 is shown to have a cutout in its upper edge at the side of C-shaped portion 78 opposed to the gap between its ends 83. Thus, arm 22a can extend through such cutout in the upper edge of C-shaped portion 78 while the ring-shaped end portion 22a' of arm 22a sits within C-shaped portion 78 above ring portion 74. It is also to be seen that arms 79a and 79b are spaced upwardly from the bottom edge of C-shaped portion 78 at the ends 83 of the latter. Thus, arm portion 75 can extend under arms 79a and 79b to avoid limiting the turning of actuating member 67. On the other hand, the turning of actuating member 67 relative to arm 22a is limited by an embossed projection 85 depending from an extension 84 of end portion 22a' and being received in aperture 77 of arm portion 75 (FIGS. 8 and 10). Since the bridging portion 79 of actuating member 68 lies above the outer part of arm portion 75 of actuating member 67 (FIG. 8) the central finger or projection 80b depending from actuating member 68, and the projection 76 of actuating member 67 are approximately in confronting relation.

As shown particularly on FIG. 6, the pair of contact leaves 61a and 61b extend between projections 80a and 80b of actuating member 68, while the other pair of contact leaves 62a and 62b extend between projections 80b and 80c. Thus, projection 80b extends between contact leaf 61b of switch 61 and contact leaf 62a of switch 62, and projection 76 of actuating member 67 similarly extends between contact leaves 61b and 62a.

In the stop mode of the apparatus illustrated on FIG. 6, contact leaves 61a and 61b of switch 61 and contact leaves 62a and 62b of switch 62 extend loosely between projections 80a and 80b and between projection 80b and 80c, respectively, and projection 76 extends loosely between contact leaves 61b and 62a so that both switches 61 and 62 remain in their normal open conditions and motor 12 is inoperative.

Figure 11A:
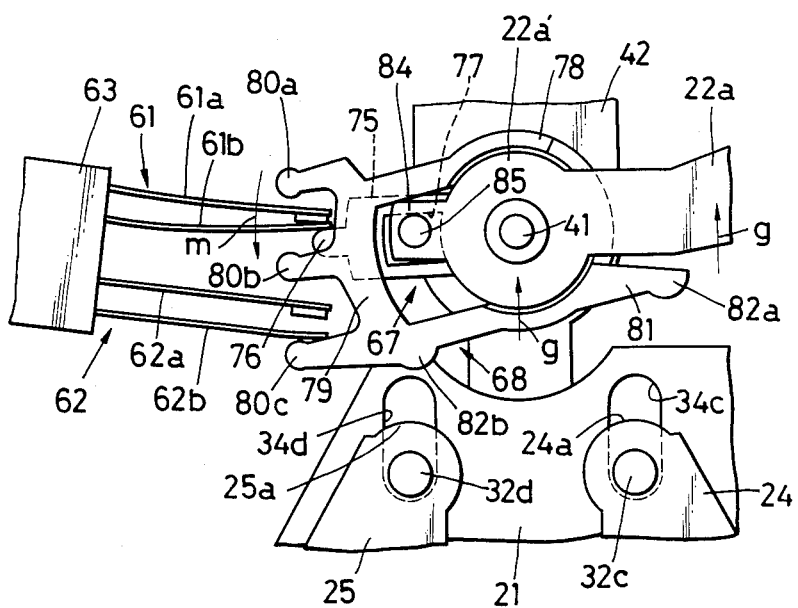
FIGS. 11A, 11B and 11C are plan views, similar to that of FIG. 6, but showing the positions of the switch actuating elements for the play mode, fast-forward mode, and rewind mode, respectively, of the apparatus.
Figure 11B:
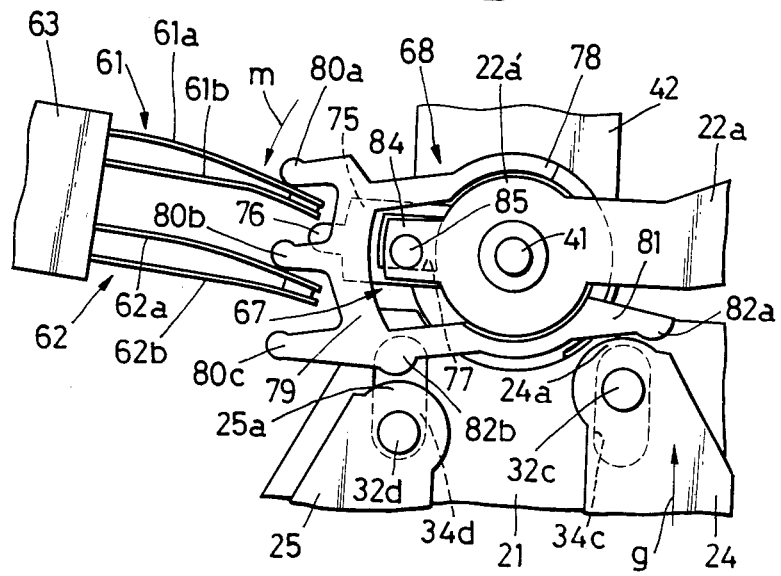

In the playback mode of the apparatus illustrated on FIG. 11A, in response to the movement of the play mode selecting slide member 22 in the direction of the arrow g, actuating member 67 is bodily moved in the direction g with arm 22a and the engagement of embossed projection 85 in aperture 77 limits the turning of actuating member 67 relative to arm 22a in the direction of the arrow m. Thus, projection 76 flexes contact leaf 61b toward contact leaf 61a for closing or actuating switch 61 and thereby causing operation of motor 12. During the movement of arm 22a in the direction of the arrow g for establishing the play mode of the apparatus, switch actuating member 68 is free to turn substantially in the direction of the arrow m so that, as shown on FIG. 11A, switch 62 remains in its opened condition. Thus, as desired, motor 12 is operated at its normal speed in the play mode of the apparatus. In the fast-forward mode of the apparatus illustrated on FIG. 11B, in response to the movement of the fast-forward mode selecting slide member 24 in the direction of the arrow g to its operative position, the rounded back end 24a of slide member 24 acts against node 82a on the tail portion 81 of switch actuating member 68 for turning the latter in the direction of the arrow m about the pivot pin 41. Such turning of switch actuating member 68 while arm 22a is at rest causes projections 80a and 80b to act against and flex contact leaves 61a and 62a for engaging the flexed contact leaves against contact leaves 61b and 62b, respectively. Thus, both switches 61 and 62 are actuated or closed to effect operation of motor 12 at the increased or high speed, as is desired for the fast-forward mode of operation.

Figure 11C:
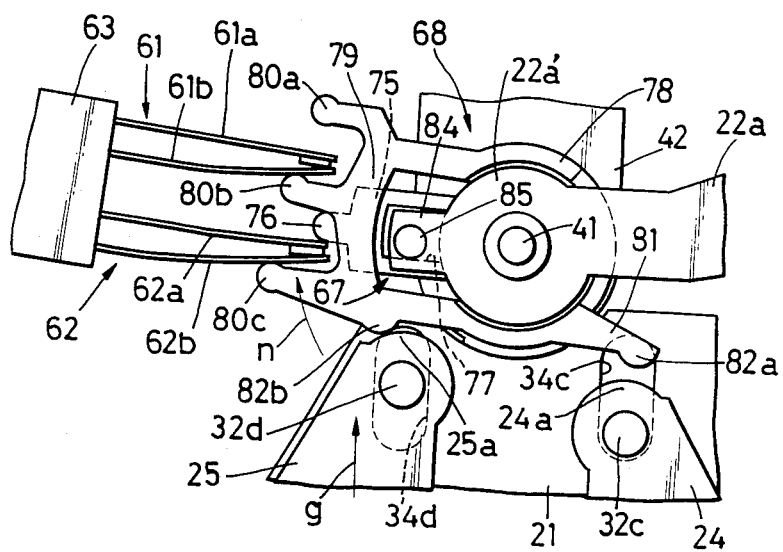

In the rewind mode of the apparatus, as shown on FIG. 11C, in response to the movement of the rewind mode selecting slide member 25 in the direction of the arrow g to its operative position, the rounded back end 25a of slide member 25 acts against the node 82b on switch actuating member 68 so as to turn the latter about pivot pin 41 in the direction of the arrow n. Such turning of actuating member 68 causes projections 80b and 80c to act against and flex contact leaves 61b and 62b, respectively, so that switches 61 and 62 are both actuated or closed for again causing operation of motor 12 at its high or increased speed.

It will be appreciated that, in the above described arrangement for controlling the operations of motor 12, the two switches 61 and 62 for controlling the supplying of power to the motor and for increasing the motor speed in the fast-forward and rewind modes can be disposed in close proximity to each other, and thus can be simultaneously assembled by the attachment of a common insulator 63 to printed circuit board 64. Further, as described, the closely disposed switches 61 and 62 can be simultaneously actuated or closed for the fast-forward or rewind mode of the apparatus merely by turning of switch actuating member 68 in the direction of the arrow m or n, respectively.

Referring now to FIG. 12, it will be seen that the screw 30d for attaching push-button 29 to rewind mode selecting slide member 25 (and similarly screw 30c for connecting push button 28 to fast-forward mode selecting slide member 24) includes a body 92 having a helical thread 91 extending along its length, a head 94 with a diameter $D_2$ larger than the diameter $D_1$ of threaded body 92 and having a slot 93 for receiving a screw driver, and a post 95 extending axially from the lower end of body portion 92 and having a diameter $D_3$ smaller than the diameter $D_1$. Further, the respective groove 53b is provided between post 95 and the adjacent end of threaded body 92.

Figure 14:
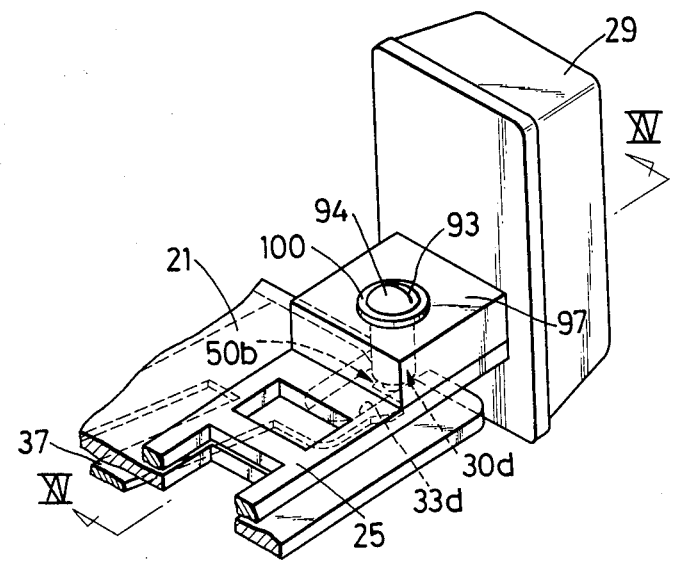
FIG. 14 is a perspective view of the elements shown on FIG. 13, but appearing in their assembled condition.
Figure 15:
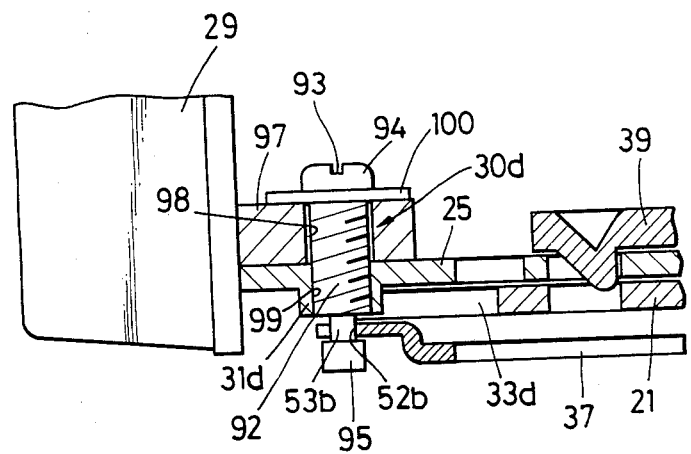
FIG. 15 is a sectional view taken along the line XV—XV on FIG. 14.

As shown on FIGS. 13, 14 and 15, push-button 29 for selecting the rewind mode is desirably molded from a synthetic resin so as to have a lug 97 extending integrally therefrom and formed with a through hole 98 having a diameter larger than the outer diameter $D_1$ of the thread 91 on body portion 92 of the screw. On the other hand, the respective collar 31d extending from slide member 25 has an internal thread 99 for engagement by the thread 91 of body portion 92. In assembling push-button 29 with slide member 25, screw member 30d is extended through a washer 100 and hole 98 in lug 97, and then threaded body portion 92 of the screw is threadably engaged with the internal threads 99 of collar 31d. Upon tightening of screw 30d, its lower portion or post 95 extends below collar 31d which is slidably guided in slot 33d of sub-chassis 21 while notched boss 52b of coupling member 37 is received in groove 53b. Thus, screw 30d functions both to secure push-button 29 to slide member 25 and also as the actuating member 51b. The screw 30c similarly operates both to secure push-button 28 to slide member 24 and also to define the actuating member 51a.

Figure 19:
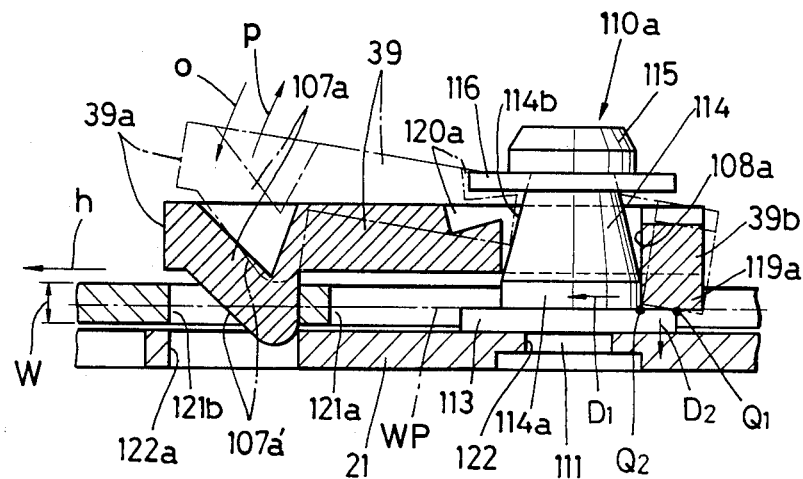
FIG. 19 is an enlarged fragmentary sectional view taken along the line XIX—XIX on FIG. 16.
Figure 20:
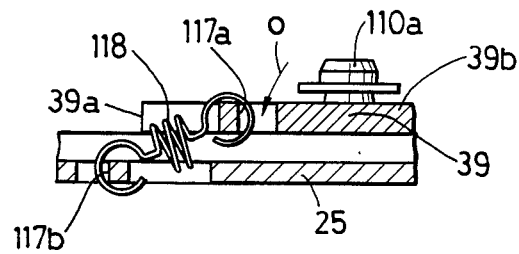
FIG. 20 is a fragmentary sectional view taken along the line XX—XX on FIG. 16.
Figure 21:
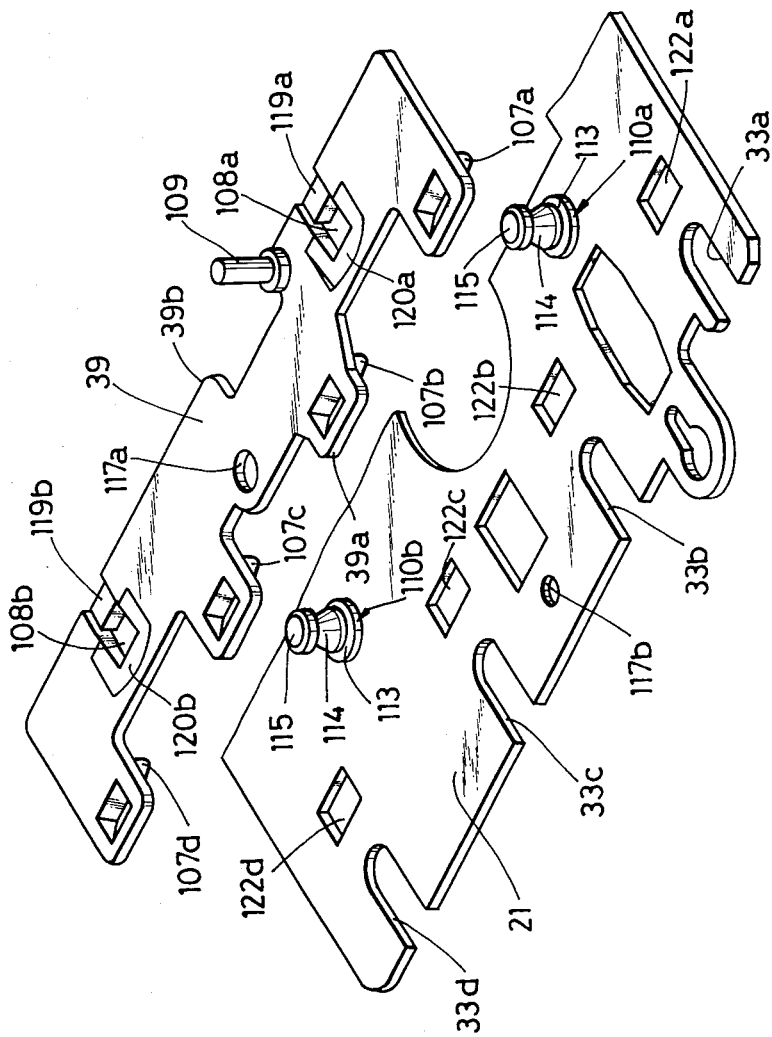
FIG. 21 is an exploded perspective view of elements inclued in the latching device of the mode changing mechanism according to this invention.

A latch mechanism which includes the latch plate 39 for selectively locking any one of mode selecting slide members 22,24 and 25 in its operative position, and for releasing the locked slide member in response to the movement of slide member 23 to its operative position, will now be described in detail with reference to FIGS. 16–21. As previously noted, slide members 22,23,24 and 25 are slidably mounted for movements parallel to each other in the directions of the arrows g and h on sub-chassis 21. The latch plate 39 extends over the substantially co-planar slide members 22–25 and, as shown particularly on FIG. 21, may be desirably formed of a pressed sheet metal. The forward portion 39a of latch plate 39 is formed with four depending embossed latch noses 107a, 107b, 107c and 107d spaced apart laterally so as to be positioned over slide members 22,23,24 and 25, respectively. Each of the latch noses 107a–107d has a right-triangular cross-section (with its sloping surface, as at 107a' on FIGS. 17A,17B and 19, or as at 107b' on FIG. 18, facing forwardly, that is, in the direction toward the respective push-button). In the rear portion 39b of latch plate 39, the latter is formed with a pair of laterally spaced apart square holes 108a and 108b, and also with an upstanding pin 109 (FIG. 21). Such pin 109 may be engageable by an auto shut-off mechanism, for example, as shown in the copending U.S. Patent Application identified as Ser. No. 632,623, filed July 19, 1984, and which forms no part of the present invention. It is sufficient merely to note that such auto shut-off mechanism is operative, for example, when the tape is completely wound from the supply reel onto the take-up reel with the apparatus in its play mode, to act on pin 109 for rocking latch plate 39 to its inactive position, and thereby to permit return of the apparatus to its stop mode. As shown on FIG. 21, a pair of pivot pins 110a and 110b extend upwardly from sub-chassis 21 at laterally spaced locations aligned with holes 108a and 108b. As shown particularly on FIG. 19, each of the pivot pins 110a and 110b has a lower end portion 111 secured in a respective hole 112 in sub-chassis 21. An enlarged pedestal portion 113 is immediately adjacent end portion 112 and bears on the upper surface of sub-chassis 21. Further, each of the pivot pins 110a and 110b has a cylindrical base portion 114a intermediate pedestal portion 113 and an upwardly tapering body portion 114 having a head 115 at its upper end. After pivot pins 110a and 110b have been inserted upwardly in square holes 108a and 108b, respectively, nylon washers 116 are mounted on the tapering body portions 114 immediately below heads 115 for preventing the removal of latch plate 39 from pivot pins 108a and 108b. As shown particularly on FIGS. 16 and 20, a tension spring 118 extends between a hole 117a in the forward portion 39a of the latch plate and a hole 117b in sub-chassis 21 so that latch plate 39 is urged to rock about pivot pins 110a and 110b in the direction of the arrow o (FIG. 20). Since spring 118 is inclined downwardly in the forward direction, as shown on FIG. 20, the force of the spring 118 has two right-angled components, that is, a component in the direction of the arrow $D_1$ on FIG. 19, and another component in the direction of the arrow $D_2$. As shown particularly on FIG. 21, latch plate 39 is downwardly embossed or offset in back of holes 108a and 108b to define depending lugs 119a and 119b. By reason of the direction in which the force of spring 118 acts on latch plate 39, the spring force in the direction of the arrow $D_1$ urges the lugs 119a and 119b against the cylindrical base portions 114a of pins 110a and 110b, respectively, while the component of the spring force in the direction of the arrow $D_2$ urges the lugs 119a and 119b downwardly upon the pedestal portions 113 of the respective pivot pins. Generally U-shaped recesses 120a and 120b are formed in the upper surface of latch plate 39 at the sides and front of holes 108a and 108b for accommodating washers 116 when latch plate 39 is rocked from its active position shown in full lines on FIG. 19 to its inactive or raised position shown in dot-dash lines.

Figure 16:
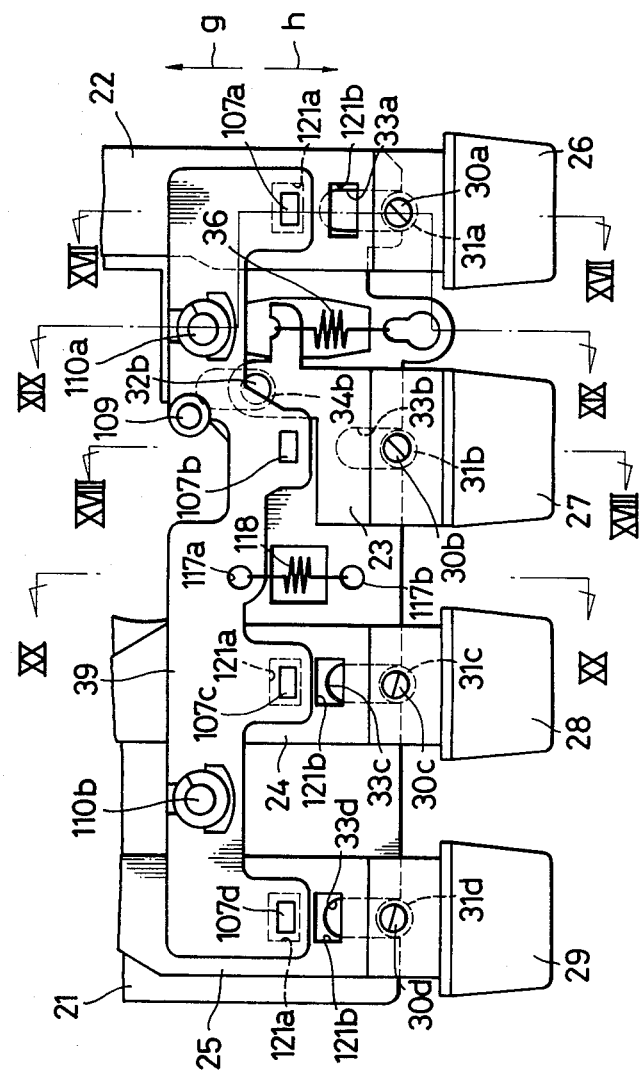
FIG. 16 is a plan view showing a latching device associated with the mode selecting slide members and respective push-button assemblies in the mode changing mechanism embodying the invention.
Figure 17A:
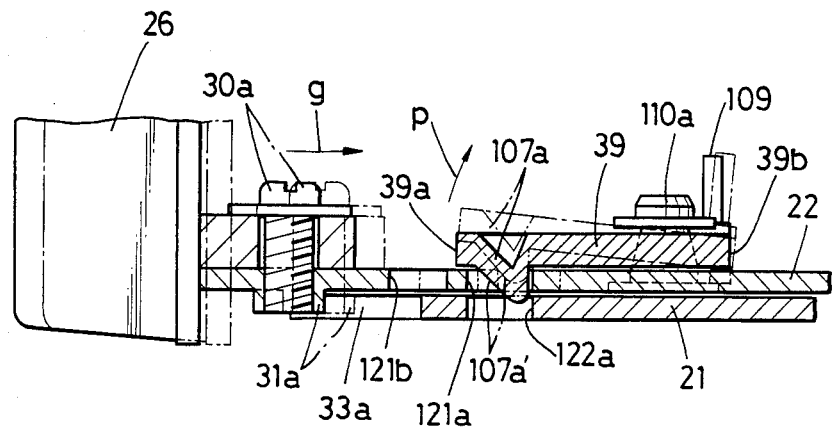
FIGS. 17A and 17B are sectional views taken along the line XVII—XVII on FIG. 16, and which show the play mode selecting slide member in its inoperative and operative positions, respectively.
Figure 17B:
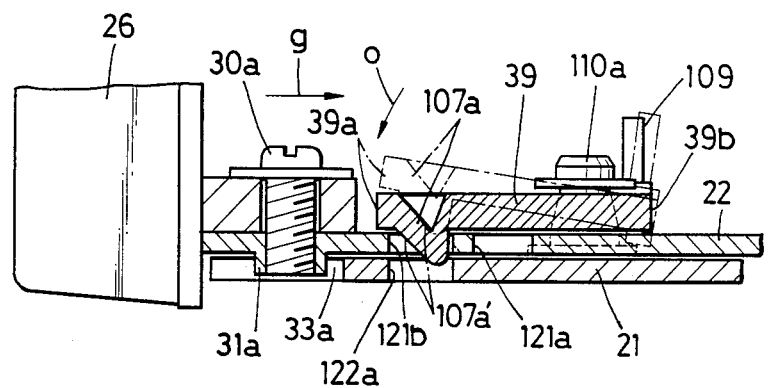

As shown in FIGS. 16, 17A and 17B, each of mode selecting slide members 22,24 and 25 is formed with a pair of keeper holes 121a and 121b spaced apart along the respective slide member and being laterally located for alignment with the latch noses 107a, 107c and 107d, respectively. It will be seen that slide member 23 for selecting the stop mode of the apparatus does not have any hole corresponding to the previously described holes or keepers 121a and 121b. Further, and as particularly shown on FIG. 21, sub-chassis 21 has four laterally spaced apart holes 122a, 122b, 122c and 122d which register with the latch noses 107a, 107b, 107c and 107d to avoid interference with the full movement of latch plate 39 to its active position.

In the stop mode of the apparatus shown in FIG. 16 and in full lines on FIG. 17A, slide members 22–25 are all urged in the direction of the arrow h by springs 35,36 and 38. The slide members 22,24 and 25 are disposed in their inoperative positions in which the noses 107a, 107b and 107d engage in the respective rearward holes 121a, while slide member 23 is also disposed in its inoperative position in which its rearward edge 23a confronts the inclined surface 107b' of latching nose 107b.

When push-button 26 is depressed for moving the associated slide member 22 in the direction of the arrow g from its inoperative position toward its operative position for selecting the play mode of the apparatus, during the initial movement of push-button 26, for example, to the position shown in dot-dash lines on FIG. 17A, the forward edge of hole 121a engages against the inclined surface 107a' of latch nose 107a so that latch plate 39 is rocked upwardly in the direction of the arrow p against the force of spring 118. As the movement of slide member 22 toward its operative position continues, latch nose 107a is lifted out of hole 121a in slide member 22 by the progressive pivoting of latch plate 39 in the direction of the arrow p around the pivot point $Q_1$ where each of lugs 119a and 119b contacts the edge of the pedestal portion 113 of the respective pivot pin 110a or 110b (FIG. 19). As indicated by the dot-dash lines on FIG. 19, in response to such pivoting of latch plate 39, the inner wall surfaces of square holes 108a and 108b move upwardly along the frusto-conical surfaces 114b of the tapering body portions 114, while nylon washers 116 are received in recesses 120a and 120b to prevent the removal of latch plate 39 from pivot pins 110a and 110b. When slide member 22 attains its operative position (FIG. 17B) for establishing the play mode of the apparatus, latch plate 39 is rocked in the direction of the arrow o by the force of spring 118 so that latch nose 107a engages in hole 121b of slide member 22 for locking the latter in its operative position.

With the play mode selecting slide member 22 being thus latched or locked in its operative position, the depending lugs 119a and 119b on latch plate 39 are urged into contact with the cylindrical base portions 114a of pins 110a and 110b by the component of the spring force acting in the direction of the arrow $D_1$, and the lower corners of the lugs 119a and 119b are held at the points indicated at $Q_2$ by the component of the spring force in the direction of the arrow $D_2$ (FIG. 19). It will be appreciated that the force of the spring 35 urging slide member 22 to return in the direction of the arrow h on FIG. 19 to the inoperative position is resisted at the right-angled surface of nose 107a engaging the back edge surface of hole 121b. If the point $Q_1$ which is effective as the pivot axis for rocking of latch plate 39 were positioned above slide member 22, the reaction to the force of spring 35, that is, the force of the back edge surface of hole 121b against the right-angled surface of latch nose 107a, would give rise to a torque tending to pivot latch plate 39 in the direction of the arrow p, that is, toward its inactive position. However, in the arrangement of latch plate 39 according to this invention, the point $Q_1$ defining the pivot axis for latch plate 39 is positioned at the center WP of the width W of slide member 22, that is, in line with the center of the surface at which slide member 22 acts against the right angled surface of nose 107a. Thus, the reaction to the force of spring 35 does not generate a force in the direction of the arrow p so that accidental release of latch plate 39 due to vibration is not likely to occur.

Figure 18:
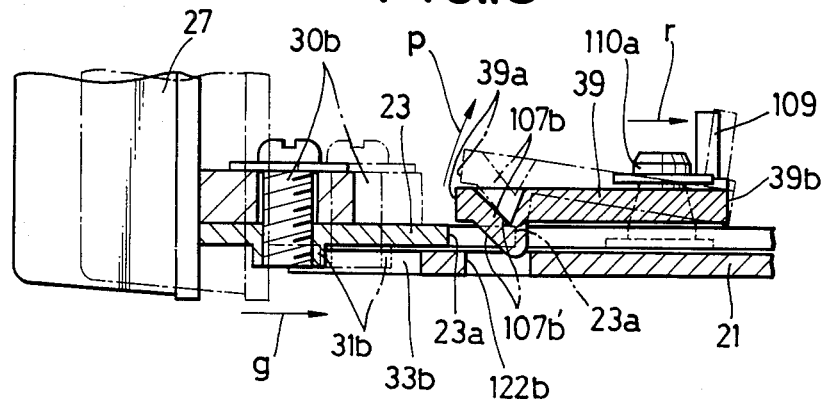
FIG. 18 is a sectional view taken along the line XVIII—XVIII on FIG. 16.

When push-button 27 is depressed in the direction of the arrow g at a time when the apparatus is in its playback mode, the back end edge 23a of slide member 23 pushes against the inclined surface 107b' of latch nose 107b so that latch plate 39 is rocked upwardly from its active position in the direction of the arrow p against the force of spring 118, for example, to the position shown in dot-dash lines on FIG. 18. In response to such rocking of latch plate 39, latch nose 107a of latch plate 39 is lifted from hole 121b in slide member 22, whereupon, slide member 22 is free to be returned to its inoperative position by the force of spring 35, as shown on FIGS. 2 and 16. As earlier noted, upon the full unwinding of the tape within a cassette, an auto shut-off mechanism (not shown) may push pin 109 in the direction of the arrow r on FIG. 18 so as to pivot latch plate 39 in the direction of the arrow p, thereby to again release slide member 22 for return to its inoperative position, that is, for restoration of the stop mode of the apparatus.

Although the operation of the illustrated latch mechanism has been specifically described with reference to the locking of slide member 22 in its operative position for maintaining a play mode of the apparatus, and then for the release of slide member 22 from its operative position so as to restore the stop mode of the apparatus in response to actuation of the stop push-button 27, it will be apparent that the operation of the latch mechanism is similar in respect to slide members 24 and 25 provided for respectively selecting the fast-forward and rewind modes of the apparatus.

It will further be seen that, in the described latch mechanism according to this invention, latch plate 39 is assembled on sub-chassis 21 merely by movement of plate 39 downwardly over slide members 22-25 in a direction perpendicular to sub-chassis 21 so as to insert pivot pins 110a and 11b into the corresponding holes 108a and 108b. Thus, the parts assembled on sub-chassis 21 are successively applied thereto in one direction, that is, downwardly from above. Further, the pivot pins 110a and 110b and the holes 108a and 108b for providing the pivotal mounting of latch plate 39 are easily formed on sub-chassis 21 and latch plate 39, respectively.

Although an illustrative embodiment of this invention has been described in detail herein with reference to the accompanying drawings, it is to be understood that the invention is not limited to that precise embodiment and that various changes and modifications may be effected therein by one skilled in the art without departing from the scope of spirit of the invention as defined in the appended claims.

What is claimed is:

1. In a cassette tape recording and/or reproducing apparatus having tape drive means including a transmission member which is shiftable for changing the operating mode of said tape drive means, a mode changing mechanism comprising:

a chassis;

first and second mode selecting slide members mounted on said chassis for movements relative to the latter independently of each other along substantially parallel paths between respective operative and inoperative positions;

a pivot arm member carrying an abutment and said transmission member of the tape drive means and being movable for shifting said transmission member;

stop means for limiting movements of said pivot arm member;

a coupling member straddling said first and second slide members and including a pair of resilient arms between which said abutment is engageable;

first and second actuating members on said first and second slide members, respectively, and being engageable with said coupling member at first and second locations, respectively, on the latter, said first and second locations being spaced apart in a direction transverse to said parallel paths of movement of the slide members; and a spring connected between said chassis and said coupling member and acting on the latter along a line of force which is intermediate said first and second locations and in a direction for simultaneously urging said coupling member against said first and second actuating members and thereby urging both of said first and second slide members to said inoperative positions thereof;

the movement of a selected one of said slide members toward its operative position causing turning of said coupling member about the actuating member on the other of said slide members with one of said resilient arms acting against said abutment to effect movement of said pivot arm member against said stop means at a position of said transmission member for establishing a corresponding mode of said tape drive means, said pivot arm member engaging said stop means prior to completion of said movement of the selected slide member to its operative position so that, with said selected slide member in said operative position, said one arm is resiliently flexed for continuously urging said transmission member to said position for establishing said corresponding mode.

2. A cassette tape recording and/or reproducing apparatus according to claim 1; further comprising means mounting said pivot arm member for swinging about a pivot axis in first and second directions in response to turning of said coupling member about said first and second actuating members, respectively, and for translation in a third direction; and wherein said transmission member is rotatably mounted on said pivot arm member and is shiftable to first, second and third positions for establishing respective modes of the tape drive means in response to swinging of said pivot arm member in said first and second directions and translation of said pivot arm member in said third direction, respectively.

3. A cassette tape recording and/or reproducing apparatus according to claim 2; wherein said pivot axis is located intermediate ends of said pivot arm member, said transmission member is mounted adjacent one of said ends of the pivot arm member, and said pivot arm member has said abutment at the other of said ends thereof for causing said swinging of the pivot arm member in said first and second directions about said pivot axis in response to said turning of said coupling member.

4. A cassette tape recording and/or reproducing apparatus according to claim 3; in which said resilient arms define a path therebetween along which said post is guided during said translation of the pivot arm member.

5. A cassette tape recording and/or reproducing apparatus according to claim 2; further comprising a third mode selecting slide member mounted on said chassis for movements relative to the latter between operative and inoperative positions along a path substantially parallel to said paths of movement of said first and second slide members, and spring means urging said third slide member toward said inoperative position thereof; and wherein said pivot axis for the pivot arm member is disposed on said third slide member for translation of said pivot arm member in said third direction in response to movement of said third slide member to said operative position thereof.

6. A cassette tape recording and/or reproducing apparatus according to claim 5; wherein said tape drive means includes a drive motor operable at normal and high speeds; and further comprising first and second switch means for controlling the operation of said drive motor, and switch actuating means actuating only said first switch means in response to movement of said third slide member to its operative position for causing operation of said drive motor at said normal speed and actuating said first and second switch means simultaneously for causing operation of said drive motor at said high speed in response to movement of either one of said first and second slide members to said operative position thereof.

7. A cassette tape recording and/or reproducing apparatus according to claim 6; wherein said switch actuating means are mounted about said pivot axis for the pivot arm member.

8. A cassette tape recording and/or reproducing apparatus according to claim 7; wherein said first and second switch means respectively include first and second pairs of normally spaced apart contact leaves which are brought together for actuating the respective switch means; said first and second pairs of contact leaves being mounted alongside said pivot axis of the pivot arm member; and said switch actuating means includes a first switch actuating member movable with said pivot arm member in said third direction in response to movement of said third slide member to its operative position and acting against said first pair of contact leaves for bringing together the latter, a second switch actuating member turnable about said pivot axis and including three spaced apart fingers extending laterally and defining first and second gaps receiving said first and second pairs of contact leaves, respectively, and being operative to bring together said first and second pairs of contact leaves upon turning of said second switch actuating member in either direction about said pivot axis, and cooperatively engageable means on said second switch actuating member and on said first and second slide members for turning said second switch actuating member in said directions about the pivot axis in response to selective movements of said first and second slide members to said operative positions.

9. A cassette tape recording and/or reproducing apparatus according to claim 6; wherein said transmission member is a rotatable idler including a normal forward gear and a fast-forward and rewind gear coaxial therewith; said tape drive means further includes take-up and supply reel drive members rotatable about spaced apart axes, outer and inner gears rotatably coupled with said take-up reel drive member, an outer gear rotatably coupled with said supply reel drive member, first and second intermediate gears respectively meshing with said inner gear and with said outer gear coupled with said supply reel drive member, and means for rotating said idler in response to operation of said motor; said idler is in a disengaged position when all of said first, second and third slide members are in said inoperative positions thereof, said fast-forward and rewind gear selectively engages said first and second intermediate gears when said transmission member is in said first and second positions, respectively, for establishing fastforward and rewind modes of the apparatus, and said normal forward gear engages said outer gear coupled with said takeup reel drive member when said transmission member is in said third position for establishing a play mode of the apparatus.

10. A cassette tape recording and/or reproducing apparatus according to claim 5; wherein said first, second and third slide members are substantially co-planar on said chassis, and have respective keepers therein; and further comprising a latch plate pivotally mounted on said chassis for movement between active and inactive positions in overlying relation to said slide members and having latch noses for selective engagement with said keepers of the slide members when one of said slide members is moved to said operative position thereof with said latch plate in said active position, means on each of said slide members to pivot said latch plate to said inactive position in response to movement of the respective slide member to its operative position and spring means urging said latch plate to said active position.

11. A cassette tape recording and/or reproducing apparatus according to claim 10; wherein said chassis has a pair of upstanding pivot pins thereon received in respective apertures in said latch plate, each of said pivot pins has a cylindrical base portion and an upwardly tapering body portion above said base portion to permit pivoting of said latch plate, said latch plate has depending lugs adjacent said apertures and engageable with said base portions of the respective pivot pins, and said spring means urging the latch plate provides force components urging said lugs toward said chassis and against said base portions of the pivot pins.

12. A cassette tape recording and/or reproducing apparatus according to claim 1, further comprising manually actuable first and second push-buttons, and first and second screw members securing said first and second push-buttons to said first and second slide members, respectively; and wherein said first and second actuating members are integral end portions of said first and second screw members extending from said first and second slide members, respectively.

13. In a cassette tape recording and/or reproducing apparatus having tape drive means including a transmission member which is shiftable for changing the operating mode of said tape drive means, a mode changing mechanism comprising:

a chassis;

first and second mode selecting slide members mounted on said chassis for movements relative to the latter independently of each other along substantially parallel paths between respective operative and inoperative positions;

a pivot arm member rotatably carrying said transmission member of the tape drive means;

means mounting said pivot arm member for swinging about a pivot axis in first and second directions and for translation in a third direction, with said transmission member being shiftable to first, second and third positions for establishing respective modes of the tape drive means in response to swinging of said pivot arm member in said first and second directions and translation of said pivot arm member in said third direction, respectively;

a coupling member straddling said first and second slide members and being engageable with said pivot arm member;

first and second actuating members on said first and second slide members, respectively, and being engageable with said coupling member at first and second locations, respectively, on the latter spaced apart in a direction transverse to said parallel paths of movement of the slide members; and a spring connected between said chassis and said coupling member and acting on the latter along a line of force which is intermediate said first and second locations and in a direction for simultaneously urging said coupling member against said first and second actuating members and thereby urging both of said first and second slide members to said inoperative positions thereof;

the movement of a selected one of said slide members to its operative position being effective to turn said coupling member about the actuating member on the other of said slide members and thereby effect swinging of said pivot arm member in said first and second directions and shifting of said transmission member for establishing a corresponding mode of said tape drive means.

* * * * *